US012763991B2

(12) United States Patent
Zheng

(10) Patent No.: US 12,763,991 B2
(45) Date of Patent: Oct. 13, 2026

(54) SIGNAL RECEIVING APPARATUS AND METHOD HAVING CHANNEL IDENTIFYING MECHANISM

(71) Applicant: REALTEK SEMICONDUCTOR CORPORATION, Hsinchu (TW)

(72) Inventor: Xiao-Guo Zheng, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 7 days.

(21) Appl. No.: 19/097,888

(22) Filed: Apr. 2, 2025

(65) Prior Publication Data

US 2025/0337616 A1 Oct. 30, 2025

(30) Foreign Application Priority Data

Apr. 29, 2024 (CN) ......................... 202410532521.5

(51) Int. Cl.
*H04L 25/02* (2006.01)
*H04L 25/03* (2006.01)

(52) U.S. Cl.
CPC ...... *H04L 25/0204* (2013.01); *H04L 25/0272* (2013.01); *H04L 2025/0377* (2013.01)

(58) Field of Classification Search
CPC ............. H04L 25/0204; H04L 25/0272; H04L 2025/0377; H04B 1/16; H04B 1/74
See application file for complete search history.

(56) References Cited

U.S. PATENT DOCUMENTS

2004/0161042 A1* 8/2004 Yamauchi ................. H01P 5/02 375/257
2010/0085873 A1* 4/2010 Moons .................. H04L 43/062 370/394
2016/0112711 A1* 4/2016 Hundal ............... G06F 13/4282 375/240.26

OTHER PUBLICATIONS

Machine translation of CN-107544934-A (Year: 2018).*

* cited by examiner

*Primary Examiner* — Jean B Corrielus
(74) *Attorney, Agent, or Firm* — WPAT, PC

(57) ABSTRACT

The presented method has a channel identifying mechanism including steps outlined below. Signal receiving is performed by signal channels, each including differential signal lines, of a signal receiving interface. A signal amount of each of the signal channels is detected in a link training process by a signal processing circuit to determine the signal channels having the signal amount matching predetermined criteria to be actual communication signal channels. Test data sequences transmitted by the actual communication signal channels are detected in the link training process by the signal processing circuit to identify a polarity order of the different signal lines and a channel number order of the actual communication signal channels according to a data pattern. Actual data receiving is performed through a signal transmission line according to the polarity order and the channel number order by the signal processing circuit after the link training process is finished.

20 Claims, 10 Drawing Sheets

500

| | DS0 | DS1 | DS2 | DS3 |
|---|---|---|---|---|
| | ⋮ | ⋮ | ⋮ | ⋮ |
| TM0 | DT4 (D10.2) | DT6 (D10.2) | DT8 (D10.2) | DT0 (K28.5-) |
| TM1 | DT5 (D10.2) | DT7 (D10.2) | DT9 (D10.2) | DT1 (D11.6) |
| TM2 | DT6 (D10.2) | DT8 (D10.2) | DT0 (K28.5-) | DT2 (K28.5+) |
| TM3 | DT7 (D10.2) | DT9 (D10.2) | DT1 (D11.6) | DT3 (D11.6) |
| TM4 | DT8 (D10.2) | DT0 (K28.5-) | DT2 (K28.5+) | DT4 (D10.2) |
| TM5 | DT9 (D10.2) | DT1 (D11.6) | DT3 (D11.6) | DT5 (D10.2) |
| TM6 | DT0 (K28.5-) | DT2 (K28.5+) | DT4 (D10.2) | DT6 (D10.2) |
| TM7 | DT1 (D11.6) | DT3 (D11.6) | DT5 (D10.2) | DT7 (D10.2) |
| TM8 | DT2 (K28.5+) | DT4 (D10.2) | DT6 (D10.2) | DT8 (D10.2) |
| TM9 | DT3 (D11.6) | DT5 (D10.2) | DT7 (D10.2) | DT9 (D10.2) |
| TM10 | DT4 (D10.2) | DT6 (D10.2) | DT8 (D10.2) | DT0 (K28.5-) |
| TM11 | DT5 (D10.2) | DT7 (D10.2) | DT9 (D10.2) | DT1 (D11.6) |
| TM12 | DT6 (D10.2) | DT8 (D10.2) | DT0 (K28.5-) | DT2 (K28.5+) |
| TM13 | DT7 (D10.2) | DT9 (D10.2) | DT1 (D11.6) | DT3 (D11.6) |
| TM14 | DT8 (D10.2) | DT0 (K28.5-) | DT2 (K28.5+) | DT4 (D10.2) |
| | ⋮ | ⋮ | ⋮ | ⋮ |

Fig. 3

SIGNAL RECEIVING APPARATUS AND METHOD HAVING CHANNEL IDENTIFYING MECHANISM

BACKGROUND OF THE INVENTION

1. Field of the Invention

The present disclosure relates to a signal receiving apparatus and a signal receiving method having a channel identifying mechanism.

2. Description of Related Art

The transmission of electronic signals is required to be performed through a specific interface. For example, the transmission of image signals can be performed through such as, but not limited to a DisplayPort (DP) interface or a Universal Serial Bus Type-C (USB Type-C) interface.

A plurality of pairs of differential signal lines for data transmission are disposed in the signal transmission interface described above. However, for the signal receiving terminal and the signal transmission terminal, the definition of the order of these differential signal lines are not the same. If no proper design or no proper mechanism for dealing such a condition is presented, the signal receiving terminal and the signal transmission terminal can not perform communication properly.

SUMMARY OF THE INVENTION

In consideration of the problem of the prior art, an object of the present disclosure is to provide a signal receiving apparatus and a signal receiving method having a channel identifying mechanism.

The present invention discloses a signal receiving apparatus having a channel identifying mechanism that includes a signal receiving interface and a signal processing circuit. The signal receiving interface includes a plurality of signal channels electrically coupled to a signal transmission line to perform signal receiving, each of the plurality of signal channels including a pair of differential signal lines. The signal processing circuit is configured to detect a signal amount of each of the plurality of signal channels to determine the plurality of signal channels having the signal amount matching a first predetermined criteria to be a plurality of actual communication signal channels in a link training process, detect a plurality of test data sequences transmitted by the plurality of actual communication signal channels to identify a polarity order of the different signal lines of each of the plurality of actual communication signal channels and a channel number order of the plurality of actual communication signal channels according to a data pattern of each of the plurality of test data sequences in the link training process and perform actual data receiving from the signal transmission line and through the plurality of actual communication signal channels according to the polarity order and the channel number order after the link training process is finished.

The present invention also discloses a signal receiving method having a channel identifying mechanism used in a signal receiving apparatus that includes steps outlined below. A signal receiving interface is electrically coupled to a signal transmission line such that a plurality of signal channels included by the signal receiving interface perform signal receiving, each of the plurality of signal channels including a pair of differential signal lines. A signal amount of each of the plurality of signal channels is detected by a signal processing circuit to determine the plurality of signal channels having the signal amount matching a first predetermined criteria to be a plurality of actual communication signal channels in a link training process. A plurality of test data sequences transmitted by the plurality of actual communication signal channels are detected by the signal processing circuit to identify a polarity order of the different signal lines of each of the plurality of actual communication signal channels and a channel number order of the plurality of actual communication signal channels according to a data pattern of each of the plurality of test data sequences in the link training process. Actual data receiving from the signal transmission line and through the plurality of actual communication signal channels is performed according to the polarity order and the channel number order by the signal processing circuit after the link training process is finished.

These and other objectives of the present disclosure will no doubt become obvious to those of ordinary skill in the art after reading the following detailed description of the preferred embodiments that are illustrated in the various figures and drawings.

BRIEF DESCRIPTION OF THE DRAWINGS

FIG. 3 illustrates a diagram of the test data sequences on the signal channels according to an embodiment of the present invention.

DETAILED DESCRIPTION OF THE PREFERRED EMBODIMENTS

An aspect of the present invention is to provide a signal receiving apparatus and a signal receiving method having a channel identifying mechanism to detect a signal amount and test data sequences so as to automatically identify the number, the signal polarity and the order of channels such that the signal receiving can be performed correctly under any channel disposition conditions.

Figure 1A:
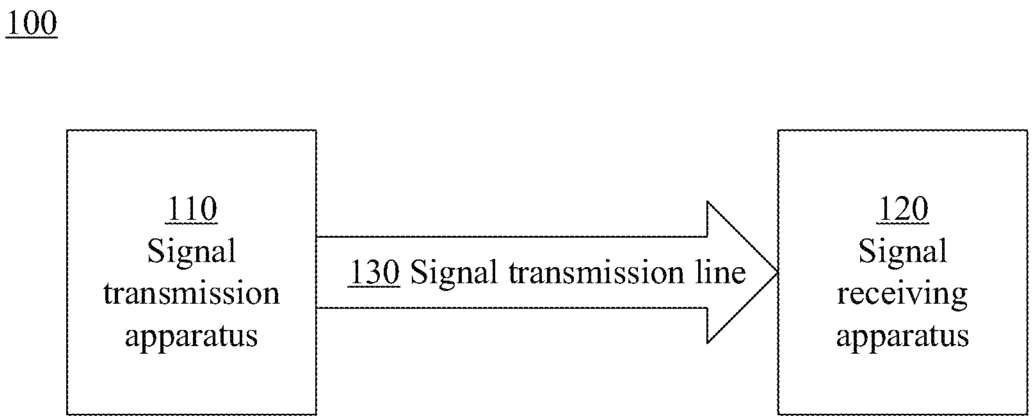
FIG. 1A illustrates a block diagram of a communication system according to an embodiment of the present invention.

Reference is now made to FIG. 1A. FIG. 1A illustrates a block diagram of a communication system 100 according to an embodiment of the present invention. The communication system 100 includes a signal transmission apparatus 110, a signal receiving apparatus 120 and a signal transmission line 130.

The signal transmission apparatus 110 is configured to perform signal transmission through the signal transmission line 130. The signal receiving apparatus 120 is configured to perform signal receiving through the signal transmission line 130. In the present embodiment, the signal transmission apparatus 110, the signal receiving apparatus 120 and the signal transmission line 130 perform the signal transmission and signal receiving through the format of a DisplayPort (DP) interface.

Figure 1B:
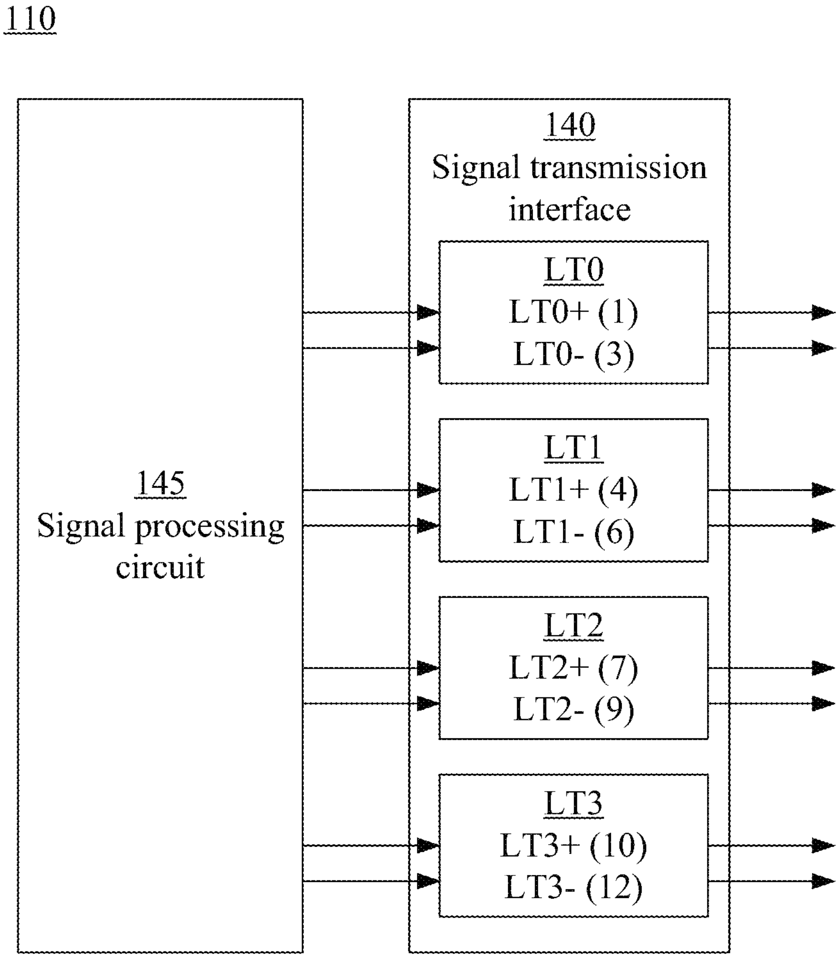
FIG. 1B illustrates a block diagram of the signal transmission apparatus according to an embodiment of the present invention.

Reference is now made to FIG. 1B. FIG. 1B illustrates a block diagram of the signal transmission apparatus 110 according to an embodiment of the present invention. The signal transmission apparatus 110 includes a signal transmission interface 140 and a signal processing circuit 145.

The signal transmission interface 140 includes a plurality of signal channels LT0~LT3 electrically coupled to the signal transmission line 130 to perform signal transmission. Each of the signal channels LT0~LT3 includes a pair of differential signal lines. Since the differential signal lines have a positive polarity and a negative polarity inversed to each other, the pair of differential signal lines corresponding to the signal channel LT0 are labeled as LT0+ and LT0−, the pair of differential signal lines corresponding to the signal channel LT1 are labeled as LT1+ and LT1−, the pair of differential signal lines corresponding to the signal channels LT2 are labeled as LT2+ and LT2−, and the pair of differential signal lines corresponding to the signal channels LT3 are labeled as LT3+ and LT3−.

In an embodiment, the signal channels LT0~LT3 can be such as, but not limited to channels called Main Link for transmitting high-speed image signals. Further, the signal transmission interface 140 may includes other channels not illustrated in FIG. 1B. The present invention is not limited thereto.

In an embodiment, the signal lines of the channels included by the signal transmission interface 140 have corresponding pin numbers, so as to be electrically coupled to the signal transmission line 130 through the pins having these pin numbers. Take FIG. 1B as an example, the differential signal lines LT0+ and LT0− have the pin numbers of 1 and 3, the differential signal lines LT1+ and LT1− have the pin numbers of 4 and 6, the differential signal lines LT2+ and LT2− have the pin numbers of 7 and 9, and the differential signal lines LT3+ and LT3− have the pin numbers of 10 and 12.

The signal processing circuit 145 is configured to generate the signals to be transmitted corresponding to the signal channels LT0~LT3 to transmit the signals through the signal transmission interface 140 to the signal transmission line 130.

Figure 1C:
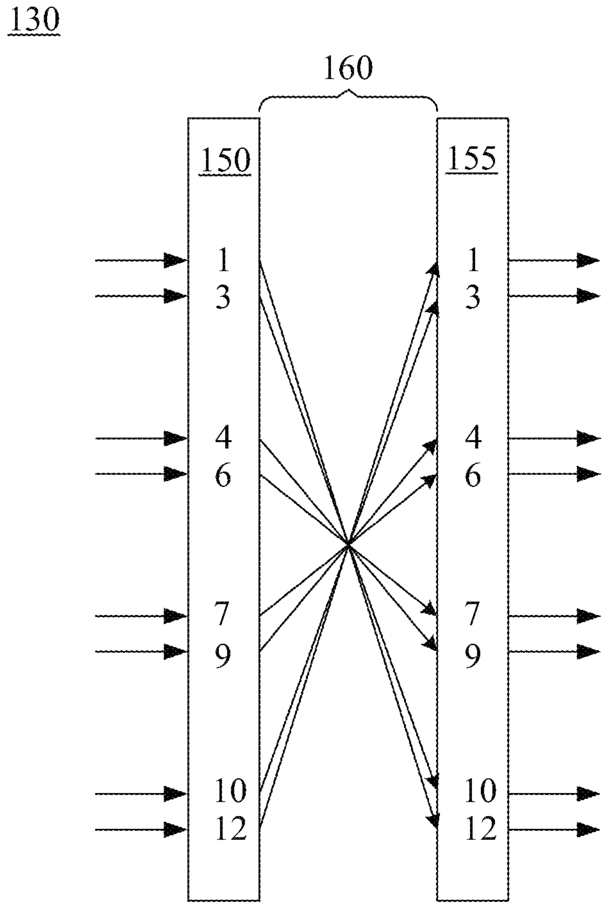
FIG. 1C illustrates a block diagram of the signal transmission line according to an embodiment of the present invention.

Reference is now made to FIG. 1C. FIG. 1C illustrates a block diagram of the signal transmission line 130 according to an embodiment of the present invention. The signal transmission line 130 includes a first terminal 150, a second terminal 155 and a line 160.

Each of the first terminal 150 and the second terminal 155 includes the pins having the corresponding pin numbers. The line 160 is configured to electrically couple the pins of the first terminal 150 and the second terminal 155. As illustrated in FIG. 1C, the pins of the first terminal 150 are electrically coupled to the pins of the second terminal 155 with an inversed direction. More specifically, the pin having the pin number 1 of the first terminal 150 is electrically coupled to the pin having the pin number 12 of the second terminal 155. The pin having the pin number 2 in the first terminal 150 is electrically coupled to the pin having the pin number 10 of the second terminal 155. Based on the same rationale, the pin having the pin number 12 in the first terminal 150 is electrically coupled to the pin having the pin number 1 of the second terminal 155.

Figure 1D:
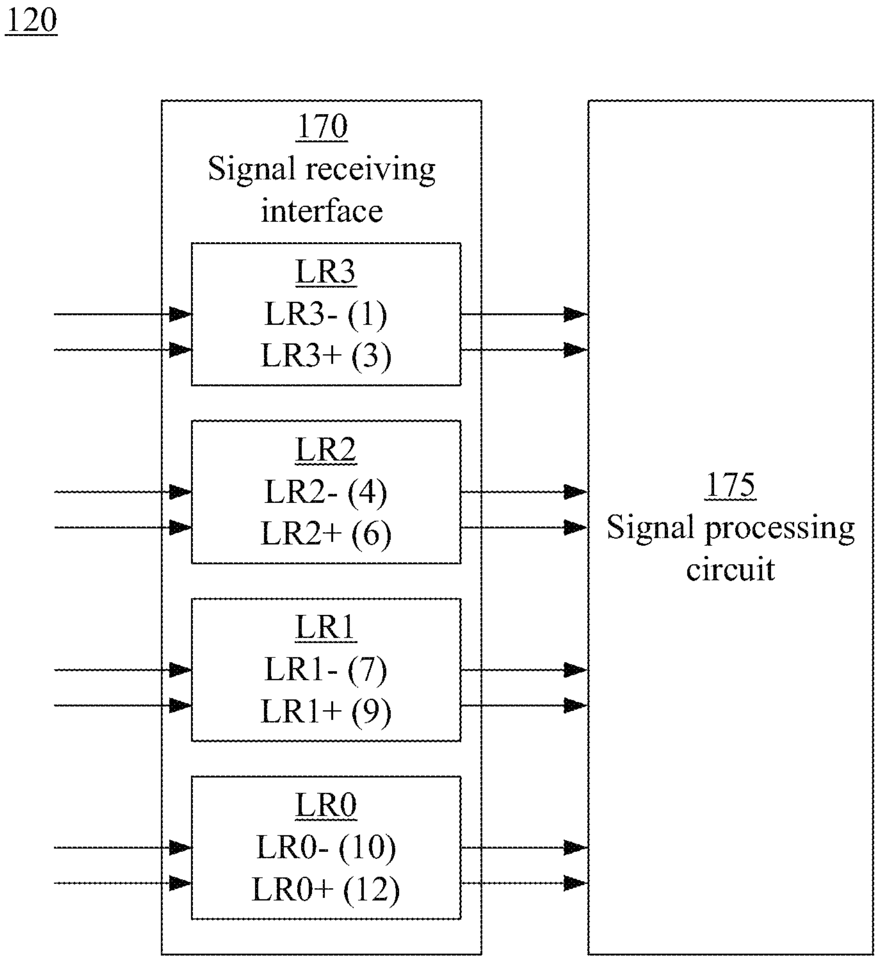
FIG. 1D illustrates a block diagram of the signal receiving apparatus according to an embodiment of the present invention.

Reference is now made to FIG. 1D. FIG. 1D illustrates a block diagram of the signal receiving apparatus 120 according to an embodiment of the present invention. The signal receiving apparatus 120 includes a signal receiving interface 170 and a signal processing circuit 175.

The signal receiving interface 170 includes a plurality of signal channels LR0~LR3 electrically coupled to the signal transmission line 130 to perform signal receiving. Each of the signal channels LR0~LR3 includes a pair of differential signal lines. Since the differential signal lines have a positive polarity and a negative polarity inversed to each other, the pair of differential signal lines corresponding to the signal channel LR0 are labeled as LR0+ and LR0−, the pair of differential signal lines corresponding to the signal channel LR1 are labeled as LR1+ and LR1−, the pair of differential signal lines corresponding to the signal channels LR2 are labeled as LR2+ and LR2−, and the pair of differential signal lines corresponding to the signal channels LR3 are labeled as LR3+ and LR3−.

In an embodiment, the signal channels LR0~LR3 can be such as, but not limited to channels called Main Link for transmitting high-speed image signals. Further, the signal receiving interface 170 may includes other channels not illustrated in FIG. 1D. The present invention is not limited thereto.

In an embodiment, the signal lines of the channels included by the signal receiving interface 170 have corresponding pin numbers, so as to be electrically coupled to the signal transmission line 130 through the pins having these pin numbers. However, it is appreciated that the configuration of the signal transmission line 130, the polarity order and the channel order of the differential signal lines of the signal receiving interface 170 in the signal receiving apparatus 120 and the polarity order and the channel order of the differential signal lines of the signal transmission interface 140 in the signal transmission apparatus 110 are different.

Take FIG. 1D as an example, the differential signal lines LR3− and LR3+ have the pin number of 1 and 3, the differential signal lines LR2− and LR2+ have the pin number of 4 and 6, the differential signal lines LR1− and LR1+ have the pin number of 7 and 9 and the differential signal lines LR0− and LR0+ have the pin number of 10 and 12. Based on the above description, the polarity order and the channel order of the differential signal lines of the signal receiving interface 170 are completely inversed to the polarity order and the channel order of the differential signal lines of the signal transmission interface 140.

The signal processing circuit 175 is configured to receive and process the signals from the signal receiving interface 170. In an embodiment, according to the channel order of the signal channels LT0~LT3 of the signal transmission apparatus 110 and the polarity order of each pair of differential signal lines, the signal processing circuit 175 expects to receive the signals transmitted by each of the pairs of the differential signal lines of the signal channels LT0~LT3 from the signal transmission apparatus 110 correspondingly through each of the pairs of the differential signal lines of the signal channels LR0~LR3.

Take the signal channels LR0 as an example, the signal processing circuit 175 expects to receive the signals of the differential signal lines LT0+ of the signal channel LT0 from the signal transmission apparatus 110 through the differential signal lines LR0+ of the signal channel LR0 and expects to receive the signals of the differential signal lines LT0− of the signal channel LT0 from the signal transmission apparatus 110 through the differential signal lines LR0− of the signal channel LR0.

However, in some scenarios, the signal receiving apparatus 120 may not dispose the channels of the signal receiving interface 170 according to the expected channel order during the manufacturing.

Figure 1E:
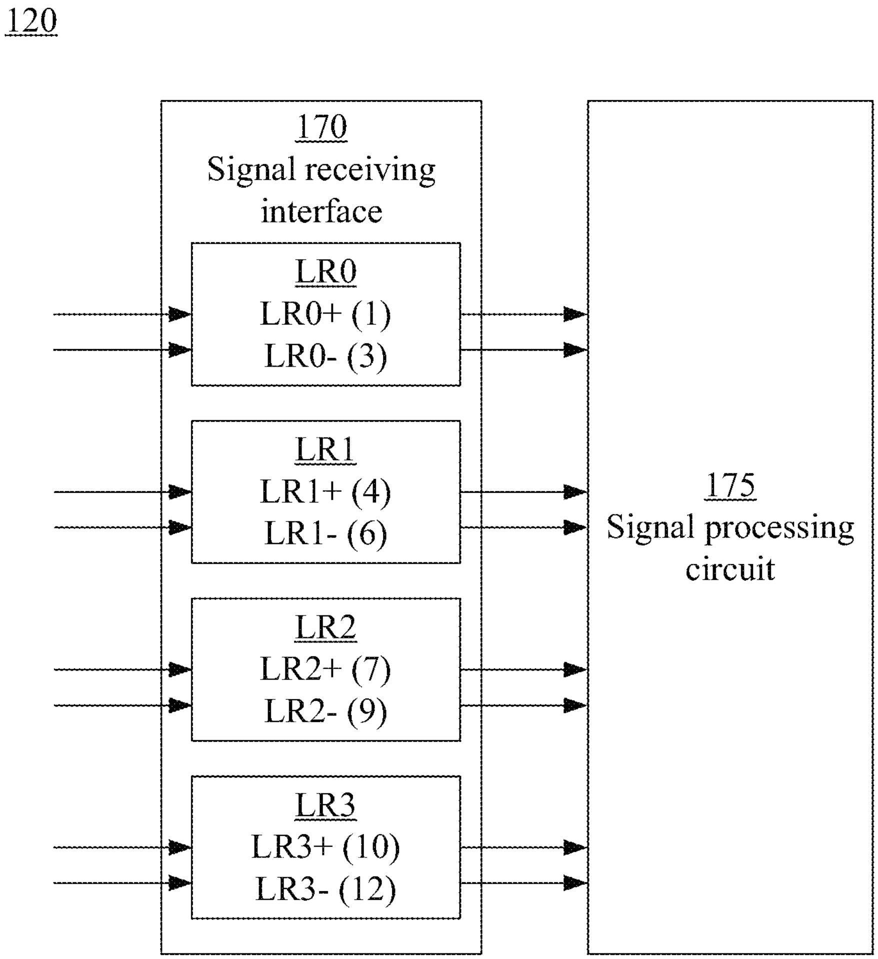
FIG. 1E illustrates a block diagram of the signal receiving apparatus having the wrongly disposed signal receiving interface according to an embodiment of the present invention.

Reference is now made to FIG. 1E. FIG. 1E illustrates a block diagram of the signal receiving apparatus 120 having the wrongly disposed signal receiving interface 170 according to an embodiment of the present invention.

In FIG. 1E, the signal receiving interface 170 and the signal transmission interface 140 have the same polarity order and the same channel order of the differential signal lines such that the differential signal lines LR0+ and LR0− have the pin number of 1 and 3, the differential signal lines LR1+ and LR1− have the pin number of 4 and 6, the differential signal lines LR2+ and LR2− have the pin number of 7 and 9, and the differential signal lines LR3+ and LR3− have the pin number of 10 and 12.

Under such a condition, take the signal channel LR0 as an example, the signal processing circuit 175 expects to receive the signals of the differential signal lines LT0+ of the signal channel LT0 from the signal transmission apparatus 110 through the differential signal lines LR0+ of signal channel LR0. However, the signal processing circuit 175 actually receives the signal of the differential signal lines LT3− of the signal channel LT3 from the signal transmission apparatus 110. If no proper mechanism for dealing such a condition is presented, the signal processing circuit 175 can not receive the signals correctly due to the wrongly disposed signal receiving interface 170.

The signal receiving apparatus 120 having the channel identifying mechanism can perform signal receiving correctly even under the condition that the channels of the signal receiving interface 170 are wrongly disposed, as illustrated in FIG. 1E. The channel identifying mechanism includes: (1) the determination of the actual communication signal channels; and (2) the identification of the polarity order and the channel number order. The channel identifying mechanism of the signal receiving apparatus 120 are described in order in the following paragraphs.

(1) The determination of the actual communication signal channels: the signal processing circuit 175 of the signal receiving apparatus 120 is configured to detect a signal amount of each of the plurality of signal channels to determine the signal channels having the signal amount matching a first predetermined criteria to be a plurality of actual communication signal channels in a link training process.

In the protocol of the DisplayPort interface, the link training process is used to execute the establishment of the Main Link and includes a clock signal transmission process for transmitting a clock signal and a test data signal transmission process for transmitting test data sequences.

The signal transmission apparatus 110 transmits the clock signal in the clock signal transmission process such that the signal receiving apparatus 120 confirms the frequency of the signal to be received. The signal transmission apparatus 110 transmits the test data sequences in the test data signal transmission process such that the signal receiving apparatus 120 confirms whether the test data sequences can be received correctly. After the link training process is finished, the signal transmission apparatus 110 performs actual data transmission to transmit the image data such that the signal receiving apparatus 120 performs actual data receiving to receive the image data.

The signal processing circuit 175 selectively detects the signal amount of the clock signal during the clock signal transmission process or detects the signal amount of the test data sequences during the test data signal transmission process. The signal processing circuit 175 further detects the test data sequences in the test data signal transmission process. In practical implementation, the signal processing circuit 175 may include a plurality of detection circuits (not illustrated in the figure) each corresponding to a pair of the differential signal lines of the signal channels LR0~LR3 to detect the signal amount of the signal channels LR0~LR3.

Figure 2A:
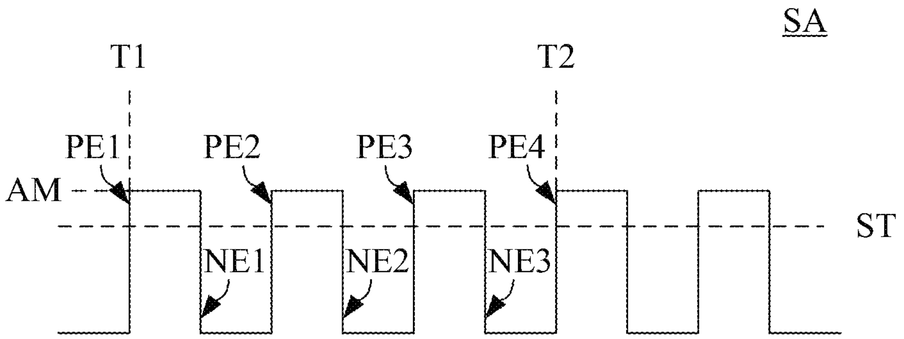
FIG. 2A and FIG. 2B respectively illustrate diagrams of signals received by the signal processing circuit 175 through the differential signal lines LR3+ of the signal channel LR3 in clock signal transmission process under different conditions according to an embodiment of the present invention.
Figure 2B:
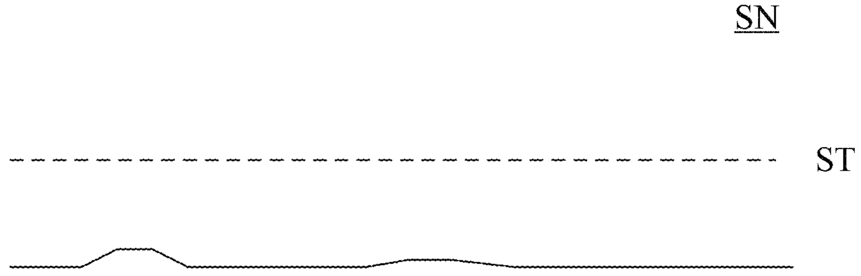

Reference is now made to FIG. 2A and FIG. 2B. FIG. 2A and FIG. 2B respectively illustrate diagrams of signals received by the signal processing circuit 175 through the differential signal lines LR3+ of the signal channel LR3 in clock signal transmission process under different conditions according to an embodiment of the present invention.

In an embodiment, the signal processing circuit 175 is configured to determine whether an instantaneous value or an average value of the signal amount is larger than a predetermined signal amount threshold value, so as to determine that the signal amount matches the first predetermined criteria when the instantaneous value or the average value is larger than the predetermined signal amount threshold value. The determination of the instantaneous value of the signal amount is described in the following paragraphs.

When the signal processing circuit 175 receives a signal SA as illustrated in FIG. 2A through the differential signal lines LR3+ of the signal channel LR3, the signal processing circuit 175 determines that the signal amount of the signal channel LR3 matches the first predetermined criteria since the instantaneous value AM at the time spot T1 is larger than the predetermined signal amount threshold value ST. Under such a condition, the signal processing circuit 175 determines that the signal on the signal channel LR3 is actually transmitted from the signal transmission apparatus 110 through the signal transmission line 130 and further determines that the signal channel LR3 is an actual communication signal channel.

When the signal processing circuit 175 receives a signal SN as illustrated in FIG. 2B through the differential signal lines LR3+ of the signal channel LR3, the signal processing circuit 175 determines that the instantaneous value of the signal in each of the time spots is not larger than the predetermined signal amount threshold value ST and further determines that the signal amount of the signal channel LR3 does not match the first predetermined criteria. Under such a condition, the signal processing circuit 175 determines that the signal on the signal channel LR3 is generated due to such as but not limited to noise and further determines that the signal channel LR3 is not the actual communication signal channel.

Similarly, the signal processing circuit 175 may detect the average value of the signal amount within a period of time to determine that the signal amount matches the first predetermined criteria when the average value is larger than a predetermined signal amount threshold value. The detail is not described herein.

In another embodiment, the signal processing circuit 175 is configured to determine a number of times that a variation amount of the signal amount is larger than a predetermined variation amount threshold value, so as to determine that the signal amount matches the first predetermined criteria when the number of times is larger than a times threshold value.

More specifically, when the variation amount of the signal amount is larger than the predetermined variation amount threshold value, the signal processing circuit 175 determines that a signal transition corresponding to a rising edge or a falling edge occurs to such a signal. As a result, the signal processing circuit 175 actually determines that the signal amount matches the first predetermined criteria when the number of the times of the occurrence of the rising edge and the falling edge is larger than the times threshold value.

For example, the threshold value of the number of times is 6. When the signal processing circuit 175 receives the signal SA as illustrated in FIG. 2A through the differential signal lines LR3+ of the signal channel LR3, the signal processing circuit 175 determines that the signal SA has four rising edges PE1~PE4 and three falling edges NE1~NE3 during the time spot T1 to the time spot T2 and further determines that the number of times (7 times) that the variation amount of the signal amount is larger than the predetermined variation amount threshold value is larger than the threshold value of the number of times (6 times). The signal processing circuit 175 thus further determines that the signal amount of the signal channel LR3 matches the first predetermined criteria. Under such a condition, the signal processing circuit 175 determines that the signal on the signal channel LR3 is actually transmitted from the signal transmission apparatus 110 through the signal transmission line 130 and further determines that the signal channel LR3 is an actual communication signal channel.

When the signal processing circuit 175 receives the signal SN as illustrated in FIG. 2B through the differential signal lines LR3+ of the signal channel LR3, the signal processing circuit 175 determines that the number of times that the variation amount of the signal amount is larger than the predetermined variation amount threshold value is not larger than the threshold value of the number of times and further determines that the signal amount of the signal channel LR3 does not match the first predetermined criteria. Under such a condition, the signal processing circuit 175 determines that the signal on the signal channel LR3 is generated due to such as but not limited to noise and further determines that the signal channel LR3 is not the actual communication signal channel.

In yet another embodiment, the signal processing circuit 175 may determine that the signal amount matches the first predetermined criteria when both the signal amount is larger than the predetermined signal amount threshold value and the number of times that the variation amount of the signal amount is larger than the predetermined variation amount threshold value. In other embodiments, the signal processing circuit 175 may perform the determination based on other parameters generated from the calculation performed on signal amount. The present invention is not limited thereto.

It is appreciated that in general, the pair of the differential signal lines of each of the signal channels LR0~LR3 receive the signals having the polarities inversed to each other. As a result, corresponding to each of the signal channels LR0~LR3, the signal processing circuit 175 only needs to perform determination of the signal amount on one of the differential signal lines (e.g., the signal line of the positive polarity '+') and does not need to perform determination of the signal amount on both of the differential signal lines.

In an embodiment, besides the link training process, the signal transmission apparatus 110 and the signal receiving apparatus 120 may perform a handshake process through the signal transmission interface 140, the signal transmission line 130 and an auxiliary (AUX) channel (not illustrated) further included by the signal receiving interface 170 such that the signal transmission apparatus 110 informs the signal receiving apparatus 120 the frequency of the signal to be transmitted and the signal channels to be used. However, even the information described above is obtained by using the handshake process, the signal receiving apparatus 120 can still confirm the actual communication signal channels from the signal channels LR0~LR3 by using the detection and determination based on the signal amount described above.

On the other hand, when the signal transmission apparatus 110 and the signal receiving apparatus 120 do not perform the handshake process, the signal receiving apparatus 120 can determine the actual communication signal channels from the signal channels LR0~LR3 by using the detection and determination based on the signal amount described above.

In the protocol of the DisplayPort interface, the signal receiving apparatus 120 may operate in a mode of single signal channel (1-lane), a mode of dual signal channels (2-lane) or a mode of four signal channels (4-lane). As a result, after the signal processing circuit 175 finishes performing the detection and determination based on the signal amount described above, the signal receiving apparatus 120 can determine whether the number of the actual communication signal channels of the signal channels LR0~LR3 is 1, 2 or 4.

(2) The identification of the polarity order and the channel number order: the signal processing circuit 175 of the signal receiving apparatus 120 is configured to detect a plurality of test data sequences transmitted by the plurality of actual communication signal channels in the link training process to identify a polarity order of the different signal lines of each of the plurality of actual communication signal channels and a channel number order of the plurality of actual communication signal channels according to a data pattern of each of the plurality of test data sequences Since the test data sequences are transmitted in the test data signal transmission process in the link training process by the signal transmission apparatus 110, the detection on the test data sequences is performed by the signal processing circuit 175 in the test data signal transmission process.

Different usage scenarios of the detection and the identification performed on the test data sequences can be distinguished based on whether the handshake process is performed and the difference of the versions of the DisplayPort interface. Four usage scenarios in different embodiments are described in the following paragraphs.

In the first usage scenario, the handshake process is performed by the signal transmission apparatus 110 and the signal receiving apparatus 120 and the version of the DisplayPort interface is 1.4. More specifically, in such a usage scenario, the signal processing circuit 175 detects the test data sequences transmitted by the actual communication signal channels after the handshake process is performed.

Under such a condition, the signal processing circuit 175 is configured to compare the data pattern with an expected data pattern to identify the polarity order. More specifically, the data pattern of the test data sequences transmitted by the signal transmission apparatus 110 is periodic. The signal processing circuit 175 of the signal receiving apparatus 120 stores the expected data pattern such that the content of the data pattern of the test data sequences under the condition that the polarity is a forward order is known.

When the data pattern matches the expected data pattern, the signal processing circuit 175 determines that the polarity order of the pair of differential signal lines is the forward order. When the data pattern does not match the expected data pattern, the signal processing circuit 175 determines that the polarity order of the pair of differential signal lines is the reverse order. In an embodiment, when the data pattern does not match the expected data pattern, the signal processing circuit 175 may reverse the polarity of the data pattern of the test data sequences to compare the reversed data pattern and the expected data pattern, or store the expected data pattern corresponding to the reversed polarity to compare the expected data pattern corresponding to the reversed polarity with the data pattern of the test data sequences, so as to confirm that the polarity order of the pair of differential signal lines is the reverse order.

In an embodiment, the signal processing circuit 175 may store the expected data pattern in advance or retrieve and store the expected data pattern from the signal transmission apparatus 110 through the performance of the handshake process. In an embodiment, since the signal processing circuit 175 may obtain the pattern of the test data sequences in advance through the performance of the handshake process, the signal processing circuit 175 may use a cyclic redundancy check (CRC) expected value to determine the expected data pattern. The signal processing circuit 175 may calculate a cyclic redundancy check actual value of the test data sequences as the data pattern to determine whether the cyclic redundancy check actual value matches the cyclic redundancy check expected value to further determine the polarity order of the differential signal lines.

On the other hand, the signal processing circuit 175 is configured to determine that the data pattern of each of the plurality of test data sequences is the same and a transmission timing between two of the plurality of test data sequences are different from each other and distanced from each other with a fixed interval, so as to determine the channel number order of the plurality of actual communication signal channels according to an order of the transmission timing.

The condition that all the signal channels LR0~LR3 are determined to be the actual communication signal channels (4-lane mode) is used as an example to describe the determination performed by the signal processing circuit 175.

Reference is now made to FIG. 3. FIG. 3 illustrates a diagram of the test data sequences DS0~DS3 on the signal channels LR0~LR3 according to an embodiment of the present invention.

As illustrated in FIG. 3, the test data sequences DS0~DS3 all include periodic data pattern and such a data pattern includes data DT0~DT9, which includes such as, but not limited to K28.5−, D11.6, K28.5+, D11.6, D10.2, D10.2, D10.2, D10.2, D10.2 and D10.2. When the test data sequences DS0~DS3 is transmitted, the signal transmission apparatus 110 transmits the test data sequences DS0~DS3 at the transmission timings different from each other, in which the neighboring two of the transmission timings are distanced from each other with a fixed interval, according to the order of the signal channels LT0~LT3 of the signal transmission interface 140. As a result, after the test data sequences DS0~DS3 are received, the signal processing circuit 175 calculates the cyclic redundancy check actual value of the test data sequences DS0~DS3 to be compared with the cyclic redundancy check expected value to determine the polarity order of the differential signal lines. The signal processing circuit 175 further determines the channel number order of the actual communication signal channels according to the order of the transmission timings.

In practical implementation, the signal processing circuit 175 may select one of the data DT0~DT9 as the foundation of the identification to count the timings. For example, the signal processing circuit 175 resets the counting value to zero when the data DT0 is received and increments the counting value by one when the each of the data DT1~DT9 is received.

For the example illustrated in FIG. 3, the values of the counting value of the test data sequence DS3 from the timing TM0 to the timing TM9 generated by the signal processing circuit 175 are 0~9. The signal processing circuit 175 resets the counting value of the test data sequence DS3 to 0 at the timing TM10. The values of the counting value of the test data sequence DS2 from the timing TM2 to the timing TM10 generated by the signal processing circuit 175 are 0~8. The values of the counting value of the test data sequence DS1 from the timing TM4 to the timing TM10 generated by the signal processing circuit 175 are 0~6. The values of the counting value of the test data sequence DS0 from the timing TM6 to the timing TM10 generated by the signal processing circuit 175 are 0~4.

At the timing TM6, the signal processing circuit 175 obtains the counting values of 0, 2, 4 and 6 of the test data sequences DS0~DS3. Since these counting values become an arithmetic sequence, the signal processing circuit 175 determines that the transmission timings between two of the plurality of test data sequences are different from each other and distanced from each other with a fixed interval and further determines that the order of the test data sequences is DS3, DS2, DS1 and DS0. The signal processing circuit 175 further determines that the channel order of the signal channel LR3 that receives the test data sequence DS3 is the first one, the channel order of the signal channel LR2 that receives the test data sequence DS2 is the second one, the channel order of the signal channel LR1 that receives the test data sequence DS1 is the third one, and the channel order of the signal channel LR0 that receives the test data sequence DS0 is the last one.

As a result, based on the channel order described above, the signal processing circuit 175 determines that the signal channel LR3 actually corresponds to the signal channel LT0 having the channel order of the first one in the signal transmission interface 140 of the signal transmission apparatus 110. The signal channel LR2 actually corresponds to the signal channel LT1 having the channel order of the second one in the signal transmission interface 140 of the signal transmission apparatus 110. The signal channel LR1 actually corresponds to the signal channel LT2 having the channel order of the third one in the signal transmission interface 140 of the signal transmission apparatus 110. The signal channel LR0 actually corresponds to the signal channel LT3 having the channel order of the last one in the signal transmission interface 140 of the signal transmission apparatus 110.

In the second usage scenario, the handshake process is performed by the signal transmission apparatus 110 and the signal receiving apparatus 120 and the version of the DisplayPort interface is 2.1. More specifically, in such a usage scenario, the signal processing circuit 175 detects the test data sequences transmitted by the actual communication signal channels after the handshake process is performed.

Under such a condition, the signal processing circuit 175 is configured to compare a certain data content of the data pattern with the expected data content to identify the polarity order.

In an embodiment, when the version of DisplayPort interface is 2.1, the data pattern of the test data sequences transmitted by the signal transmission apparatus 110 is the sequence 128b132B_DP_TPS2, and such a sequence includes a PHY sync symbol. The signal processing circuit 175 stores a forward content 33CCCCCCh under the condition that the polarity of the PHY sync symbol is the forward order and the reverse content CC333333h under the condition that the polarity of the PHY sync symbol is the reverse order in advance.

As a result, after receiving the data pattern of the test data sequences, the signal processing circuit 175 determines that whether the PHY sync symbol (i.e., the certain data content) included therein matches the forward content, so as to determine that the polarity order of the pair of the differential signal lines is the forward order when the PHY sync symbol matches the forward content. On the other hand, the signal processing circuit 175 determines that the polarity order of the pair of the differential signal lines is the reverse order when the PHY sync symbol does not match the forward content or when the PHY sync symbol matches the reverse content.

On the other hand, the signal processing circuit 175 is configured to descramble a plurality of combinations of the plurality of test data sequences DS0~DS3 according to a plurality of channel predetermined initial values corresponding to the channel number order, so as to determine the channel number order of the plurality of actual communication signal channels according to a specific combination of the plurality of combinations when a data symbol of the data pattern generated after the specific combination is descrambled matches a predetermined value. For example, when the data sequence is the sequence 128b132B_DP_TPS2, the data symbol is fixed to be 0. However, the present invention is not limited thereto.

For example, the signal processing circuit 175 may in turn assume an order of one of the 24 combinations of the test data sequences DS0~DS3 matches the channel number order so as to descramble the 24 combinations one by one according to the known channel predetermined initial values. When the data symbol of the data pattern generated after the descrambling is performed on a specific combination of the 24 combinations is 0, the descrambling result is correct. The signal processing circuit 175 determines that the order of the specific combination corresponds to the channel number order of the actual communication signal channels.

For example, when the descrambling result of the order of the test data sequences DS3, DS2, DS1 and DS0 is correct, the signal processing circuit 175 determines that the order of such a specific combination corresponds to the channel number order of the actual communication signal channels. The signal processing circuit 175 further determines that the signal channel LR3 that receives the test data sequence DS3 actually corresponds to the signal channel LT0 (which is the first one in the channel order) in the signal transmission interface 140 of the signal transmission apparatus 110, the signal channel LR2 that receives the test data sequence DS2 actually corresponds to the signal channel LT1 (which is the second one in the channel order) in the signal transmission interface 140 of the signal transmission apparatus 110, the signal channel LR1 that receives the test data sequence DS1 actually corresponds to the signal channel LT2 (which is the third one in the channel order) in the signal transmission interface 140 of the signal transmission apparatus 110, and the signal channel LR0 that receives the test data sequence DS0 actually corresponds to the signal channel LT3 (which is the last one in the channel order) in the signal transmission interface 140 of the signal transmission apparatus 110.

In the third usage scenario, the handshake process is not performed by the signal transmission apparatus 110 and the signal receiving apparatus 120 and the version of the DisplayPort interface is 1.4.

When the handshake process is not performed by the signal transmission apparatus 110 and the signal receiving apparatus 120, the signal processing circuit 175 performs a clock data recovery process to rebuild and detect the plurality of test data sequences.

More specifically, even if the handshake process is not performed, the signal processing circuit 175 can still determine the frequency of the clock signal based on the detection of the signal amount in the first stage to perform the clock data recovery process. When the period clock signal is finished being transmitted and the irregular rising edges and falling edges are detected, the signal processing circuit 175 determines that the test data signal transmission process begins and detects the test data sequences.

Under such a condition, the signal processing circuit 175 is configured to compare the certain data content of the data pattern with the expected data content to identify the polarity order.

In an embodiment, when the version of the DisplayPort interface is 1.4, the data pattern of the test data sequences transmitted by the signal transmission apparatus 110 includes main stream attribute data (MSA). When the main stream attribute data of the descrambled data patterns in a plurality of different frames are the same and the data size matches a second predetermined criteria, the signal processing circuit 175 determines that the polarity order is the forward order. On the other hand, when the main stream attribute data of the descrambled data patterns in the plurality of different frames are not the same or when the data size does not match the second predetermined criteria, the signal processing circuit 175 determines that the polarity order is the reverse order. In an embodiment, for the main stream attribute data, such second predetermined criteria is that the image total length is always larger than a length of an image actual display area and the image total width is always larger than a width of the image actual display area. However, the present invention is not limited to the use of the main stream attribute data, and may use different predetermined criteria based on the data pattern that is used to perform determination.

On the other hand, the signal transmission apparatus 110 may use the method same as the first usage scenario to determine that the data pattern of each of the plurality of test data sequences is the same and a transmission timing between two of the plurality of test data sequences are different from each other and distanced from each other with a fixed interval, so as to determine the channel number order of the plurality of actual communication signal channels according to an order of the transmission timing. The detail is not described herein.

In the fourth usage scenario, the handshake process is not performed by the signal transmission apparatus 110 and the signal receiving apparatus 120 and the version of the DisplayPort interface is 2.1.

Similar to the third usage scenario, when the handshake process is not performed by the signal transmission apparatus 110 and the signal receiving apparatus 120, the signal processing circuit 175 performs a clock data recovery process to rebuild and detect the plurality of test data sequences.

Under such a condition, the signal processing circuit 175 may use the method same as the second usage scenario to compare the certain data content of the data pattern with the expected data content to identify the polarity order of the differential signal lines. It is appreciated that during the transmission of the image data, the PHY sync symbol may include the conditions of XY111111h or XY4444444h, which is different from the transmission of the sequence 128b132B_DP_TPS2. However, when the polarity is reversed, the content of X'Y'EEEEEEh or X'Y'BBBBBBh may be received periodically. The signal processing circuit 175 can thus determine the polarity accordingly.

On the other hand, the signal processing circuit 175 may use the method same as the second usage scenario to descramble the plurality of combinations of the plurality of test data sequences DS0~DS3 according to the plurality of channel predetermined initial values and determine the channel number order of the actual communication signal channels according to the descrambled result. For example, the descrambled data has the same control link symbol and the data after the control link symbol is the same only when the channel number order is correct. The signal processing circuit 175 can thus determine the channel number order of the actual communication signal channels accordingly.

It is appreciated that in general, the pair of differential signal lines of each of the signal channels LR0~LR3 transmit the signals having the polarities inversed to each other. As a result, corresponding to each of the signal channels LR0~LR3, the signal processing circuit 175 only needs to perform determination of the signal amount on one of the differential signal lines (e.g., the signal line of the positive polarity '+') and does not need to perform determination of the signal amount on both of the differential signal lines.

In the embodiments described above, the condition that the number of the actual communication signal channels is 4 (the mode of four signal channels) is used as an example. However, under the condition that the number of the actual communication signal channels is 2 (the mode of dual signal channels), the signal processing circuit 175 can also detect the test data sequences to identify polarity order of the differential signal lines and the channel number order of the actual communication signal channels, based on the method described above. When the number of the actual communication signal channels is 1 (the mode of single signal channel), the signal processing circuit 175 only needs to identify the polarity order and does not need to determine the channel number order.

After the link training process is finished, the signal processing circuit 175 performs actual data receiving from the signal transmission line and through the plurality of actual communication signal channels according to the polarity order and the channel number order.

More specifically, when the polarity order is the forward order, the signal processing circuit 175 directly receives the data through the pair of the differential signal lines of each of the actual communication signal channels. When the polarity order is the reverse order, the signal processing circuit 175 reverses and receives the data from the pair of differential signal lines of each of the plurality of actual communication signal channels. On the other hand, the signal processing circuit 175 performs actual data receiving from the signal transmission line through the actual communication signal channels according to the determined channel number order.

For the example illustrated in FIG. 1E, when all the signal channels LR0~LR3 are determined to be the actual communication signal channels (the mode of four signal channels), the signal processing circuit 175 further determines that the polarity order of the differential signal lines is the reverse order, and the signal channels LR3~LR0 actually correspond to the signal channels LT0~LT3.

As a result, after the processing of the channel identification mechanism, the signal processing circuit 175 performs actual data receiving according to the channel order of the signal channels LR3~LR0 and reverses the data of each pairs of the differential signal lines in the signal channels LR3~LR0.

The signal processing circuit 175 determines that the signals that the differential signal lines LR3− and LR3+ of the signal channel LR3 are actually from the differential signal lines LT0+ and LT0− of the signal channel LT0, the signals that the differential signal lines LR2− and LR2+ of the signal channel LR2 are actually from the differential signal lines LT1+ and LT1− of the signal channel LT1, the signals that the differential signal lines LR1− and LR1+ of the signal channel LR1 are actually from the differential signal lines LT2+ and LT2− of the signal channel LT2, and the signals that the differential signal lines LR0− and LR0+ of the signal channel LR0 are actually from the differential signal lines LT3+ and LT3− of the signal channel LT3. The correct signal receiving result can be obtained.

Figure 4A:
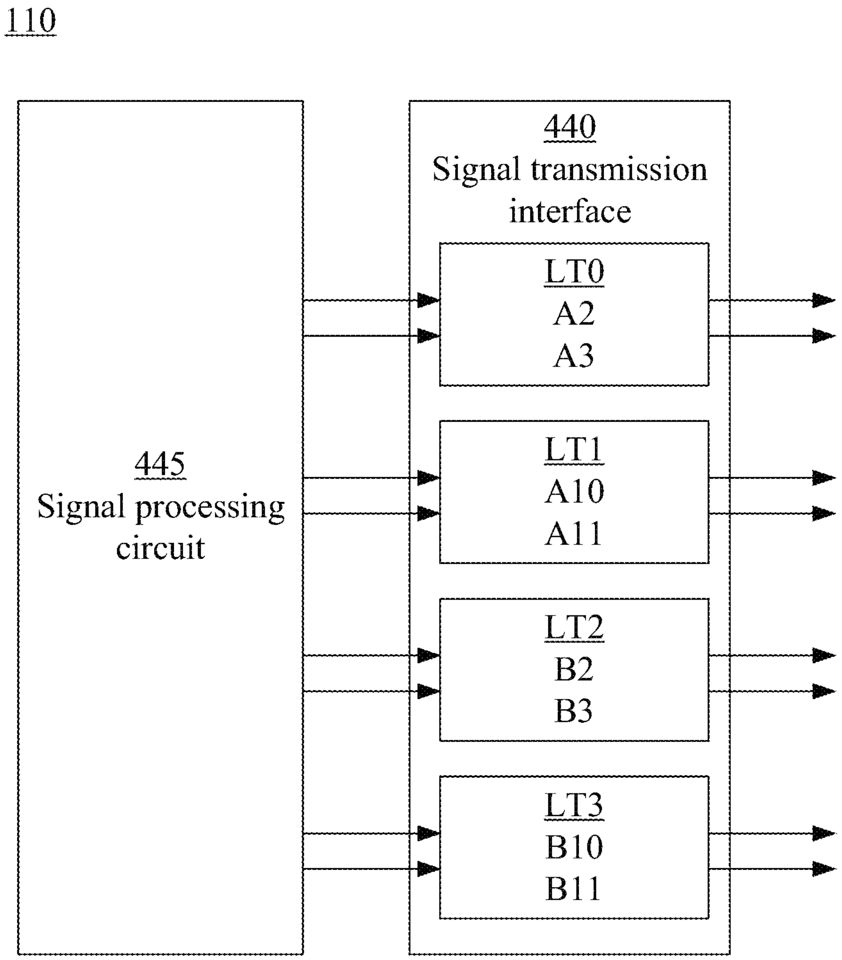
FIG. 4A illustrates a block diagram of the signal transmission apparatus according to another embodiment of the present invention.
Figure 4B:
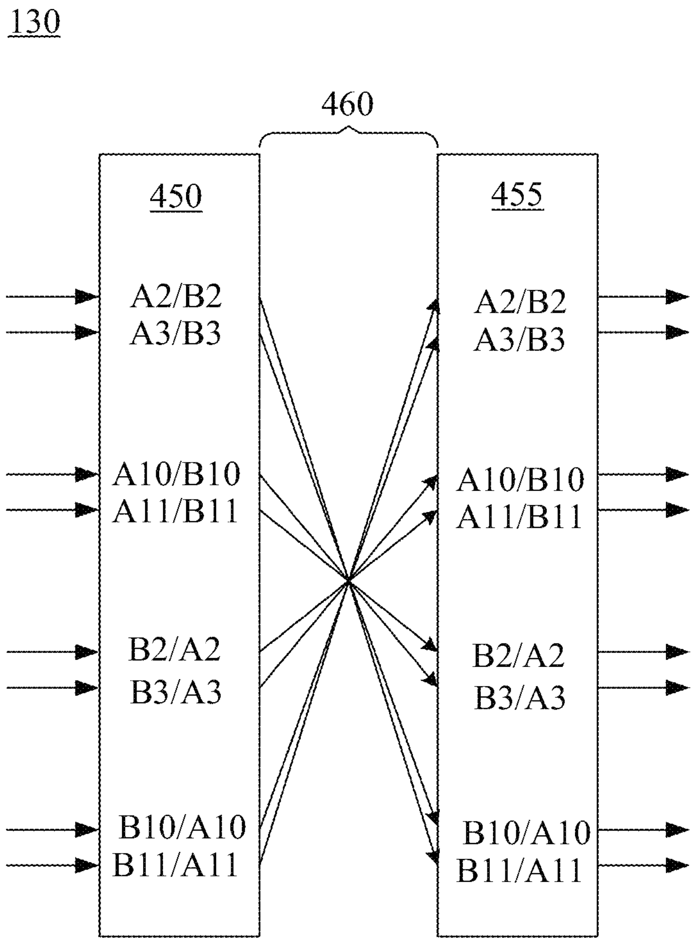
FIG. 4B illustrates a block diagram of the signal transmission line according to another embodiment of the present invention.
Figure 4C:
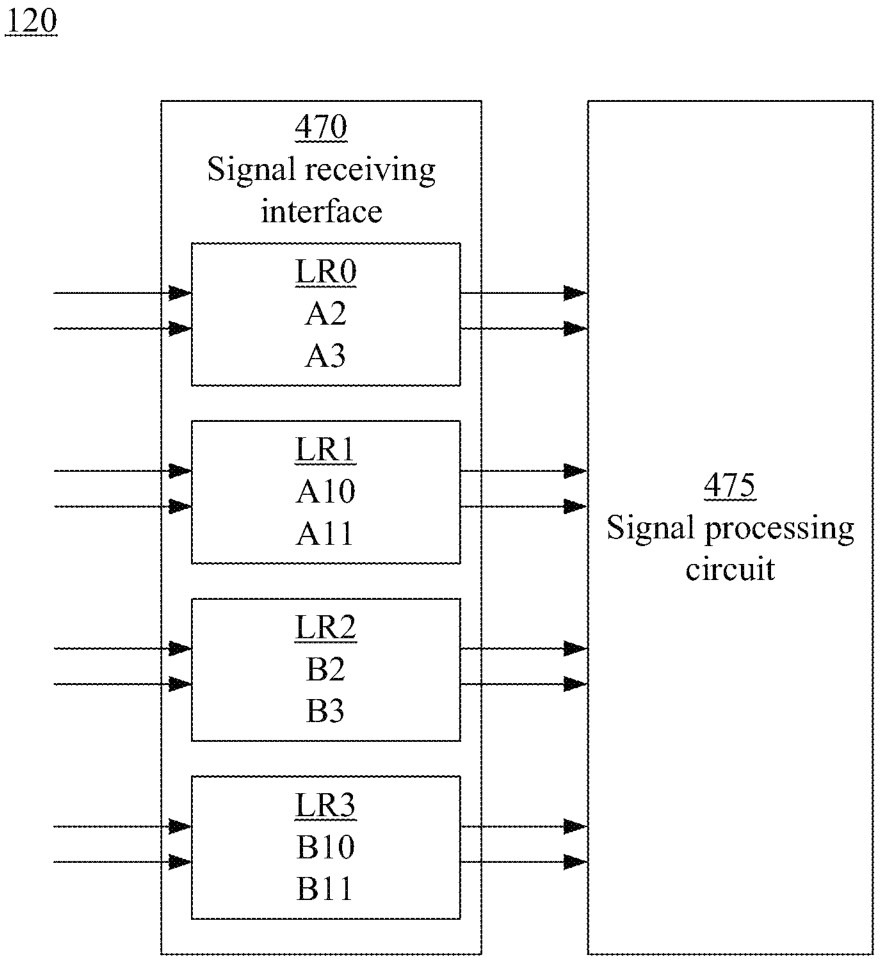
FIG. 4C illustrates a block diagram of the signal receiving apparatus according to another embodiment of the present invention.

Reference is now made to FIG. 4A, FIG. 4B and FIG. 4C at the same time. FIG. 4A illustrates a block diagram of the signal transmission apparatus 110 according to another embodiment of the present invention. FIG. 4B illustrates a block diagram of the signal transmission line 130 according to another embodiment of the present invention. FIG. 4C illustrates a block diagram of the signal receiving apparatus 120 according to another embodiment of the present invention. In the present embodiment, the signal transmission apparatus 110, the signal receiving apparatus 120 and the signal transmission line 130 perform signal transmission and signal receiving through the format of a Universal Serial Bus Type-C (USB Type-C) interface.

In the present embodiment, the signal transmission apparatus 110 includes a signal transmission interface 440 and a signal processing circuit 445. The signal receiving apparatus 120 includes a signal receiving interface 470 and a signal processing circuit 475. The signal transmission interface 440 and the signal receiving interface 445 respectively include a plurality of the signal channels LT0~LT3 and a plurality of the signal channels LR0~LR3, each of the signal channels including a pair of differential signal lines. The pairs of the differential signal lines are in turn labeled as A2 and A3, A10 and A11, B2 and B3 and B10 and B11.

The signal transmission line 130 includes a first terminal 450, a second terminal 455 and a line 460. Each of the first terminal 450 and the second terminal 455 includes pins corresponding to the differential signal lines described above.

The line 460 makes the pins of the first terminal 450 and the second terminal 455 electrically coupled to each other in a reverse order. Since the Universal Serial Bus Type-C interface supports the unflipped connection and flipped connection, the pins of the signal transmission line 430 at the first terminal 450 and the second terminal 455 are labeled as A2/B2 and A3/B3, A10/B10 and A11/B11, B2/A2 and B3/A3 and B10/A10 and B11/A11. The state of the unflipped connection is labeled in front of the sign '/' and the state of the flipped connection is labeled behind the sign '/'.

Due to the characteristic that the signal transmission line 130 supports the unflipped connection and flipped connection, the signal processing circuit 470 of the signal receiving apparatus 120 still needs to determine the number, the polarity order and the channel order of the actual communication signal channels to accomplish the correct data receiving. The signal receiving apparatus 420 can use the methods described in the above embodiments that use the DisplayPort interface as an example to perform determination to implement the channel identification mechanism to accomplish the object of correct actual data receiving.

Figure 5:
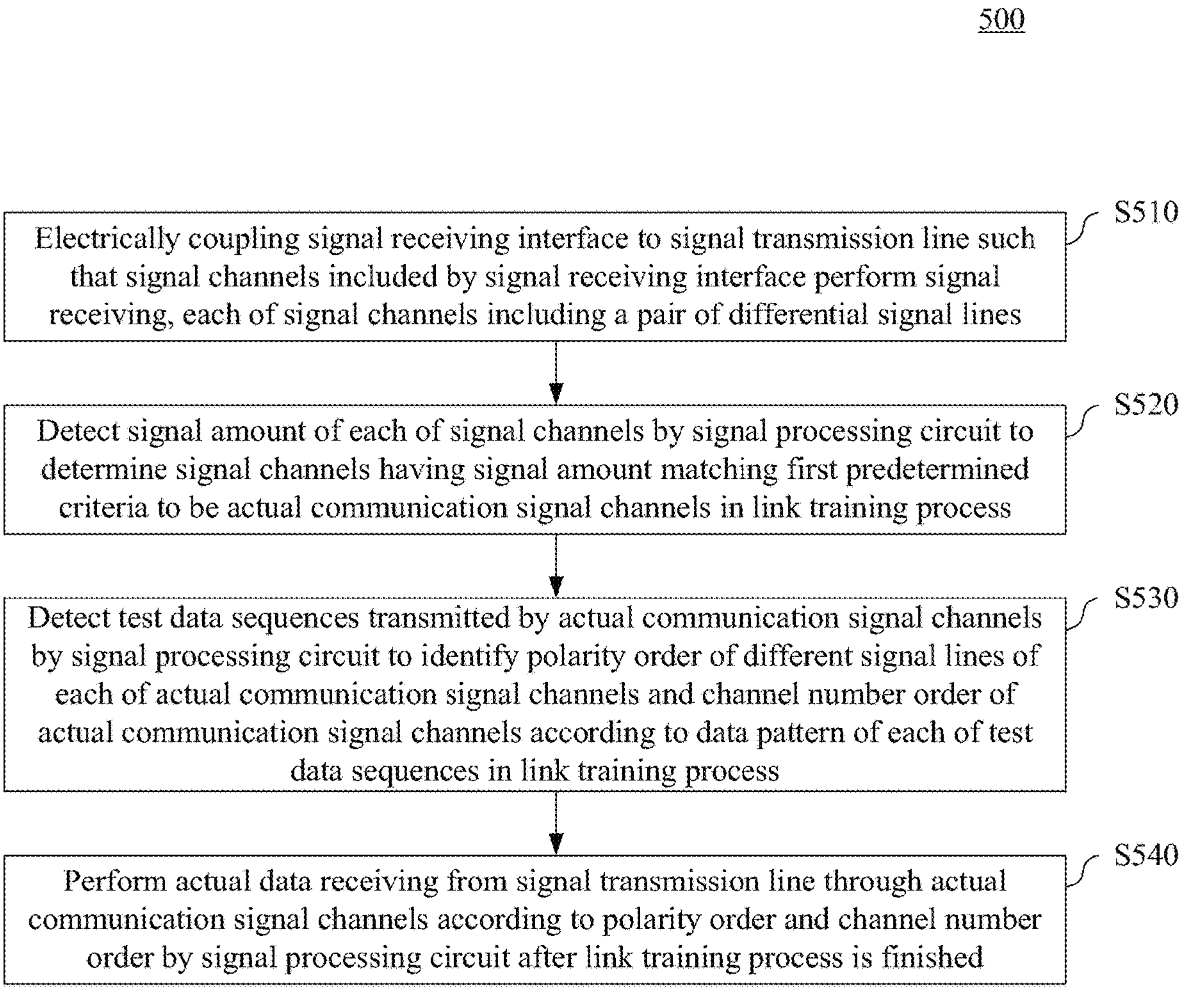
FIG. 5 illustrates a flow chart of a signal receiving method having a channel identifying mechanism according to an embodiment of the present invention.

Reference is now made to FIG. 5. FIG. 5 illustrates a flow chart of a signal receiving method 500 having a channel identifying mechanism according to an embodiment of the present invention.

Besides the apparatus described above, the present invention further discloses the signal receiving method 500 having the channel identifying mechanism that can be used in such as, but not limited to the signal receiving apparatus 100 illustrated in FIG. 1. An embodiment of the signal receiving method 500 is illustrated in FIG. 5 and includes the steps outlined below.

In step S510, the signal receiving interface 170 is electrically coupled to the signal transmission line 130 such that the plurality of signal channels LR0~LR3 included by the signal receiving interface 170 perform signal receiving, each of the plurality of signal channels LR0~LR3 including a pair of differential signal lines.

In step S520, the signal amount of each of the plurality of signal channels LR0~LR3 is detected by the signal processing circuit 175 to determine the plurality of signal channels having the signal amount matching a first predetermined criteria to be the plurality of actual communication signal channels in the link training process.

In step S530, the plurality of test data sequences transmitted by the plurality of actual communication signal channels are detected by the signal processing circuit 175 to identify the polarity order of the different signal lines of each of the plurality of actual communication signal channels and the channel number order of the plurality of actual communication signal channels according to the data pattern of each of the plurality of test data sequences in the link training process.

In step S540, the actual data receiving from the signal transmission line and through the plurality of actual communication signal channels is performed according to the polarity order and the channel number order by the signal processing circuit 175 after the link training process is finished.

It is appreciated that the embodiments described above are merely an example. In other embodiments, it is appreciated that many modifications and changes may be made by those of ordinary skill in the art without departing, from the spirit of the invention.

For example, the present invention can be applied to other signal transmission interfaces having a plurality of signal channels and is not limited to the DisplayPort interface and the Universal Serial Bus Type-C interface. Further, the number of the signal channels described above is merely an example, in which the present invention can be applied to the scenarios of more signal channels. Moreover, the embodiments described above use the condition that the channel orders of the signal receiving interface and the signal transmission interface are completely inversed to each other as an example. However, the present invention can perform identification under the condition that the signal receiving interface is arranged with any channel order. The present invention is not limited to the channel order described in the above embodiments.

In summary, the signal receiving apparatus and signal receiving method having a channel identifying mechanism detect a signal amount and test data sequences so as to automatically identify the number, the signal polarity and the order of channels such that the signal receiving can be performed correctly under any channel disposition conditions.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A signal receiving apparatus having a channel identifying mechanism comprising:

a signal receiving interface comprising a plurality of signal channels electrically coupled to a signal transmission line to perform signal receiving, each of the plurality of signal channels comprising a pair of differential signal lines; and a signal processing circuit configured to:

in a link training process, detect a signal amount of each of the plurality of signal channels, to determine the plurality of signal channels having the signal amount matching a first predetermined criteria to be a plurality of actual communication signal channels;

in the link training process, detect a plurality of test data sequences transmitted by the plurality of actual communication signal channels to identify a polarity order of the different signal lines of each of the plurality of actual communication signal channels and a channel number order of the plurality of actual communication signal channels according to a data pattern of each of the plurality of test data sequences; and after the link training process is finished, perform actual data receiving from the signal transmission line through the plurality of actual communication signal channels according to the polarity order and the channel number order.

2. The signal receiving apparatus of claim 1, wherein the signal processing circuit is configured to determine whether an instantaneous value or an average value of the signal amount is larger than a predetermined signal amount threshold value, so as to determine that the signal amount matches the first predetermined criteria when the instantaneous value or the average value is larger than the predetermined signal amount threshold value.

3. The signal receiving apparatus of claim 1, wherein the signal processing circuit is configured to determine a number of times that a variation amount of the signal amount is larger than a predetermined variation amount threshold value, so as to determine that the signal amount matches the first predetermined criteria when the number of times is larger than a threshold value of the number of times.

4. The signal receiving apparatus of claim 1, wherein the signal processing circuit is configured to compare the data pattern with an expected data pattern or compare a certain data content of the data pattern with an expected data content to identify the polarity order, so as to be configured to:

determine that the polarity order is a forward order when the data pattern matches the expected data pattern or when the certain data content matches the expected data content;

determine that the polarity order is a reverse order when the data pattern does not match the expected data pattern or when the certain data content does not match the expected data content;

receive data from the pair of differential signal lines of each of the plurality of actual communication signal channels when the polarity order is the forward order; and reverse and receive the data from the pair of differential signal lines of each of the plurality of actual communication signal channels when the polarity order is the reverse order.

5. The signal receiving apparatus of claim 4, wherein the certain data content is a physical layer (PHY) synchronization (sync) symbol or main stream attribute data (MSA), such that the polarity order is determined to be the forward order when the physical layer synchronization symbol matches a forward content or when the main stream attribute data corresponding to the data pattern of a plurality of different frames is the same and a data size matches a second predetermined criteria.

6. The signal receiving apparatus of claim 1, wherein the signal processing circuit is configured to determine that the data pattern of each of the plurality of test data sequences is the same and a transmission timing between two of the plurality of test data sequences are different from each other and distanced from each other with a fixed interval, so as to determine the channel number order of the plurality of actual communication signal channels according to an order of the transmission timing.

7. The signal receiving apparatus of claim 1, wherein the signal processing circuit is configured to descramble a plurality of combinations of the plurality of test data sequences according to a plurality of channel predetermined initial values corresponding to the channel number order, so as to determine the channel number order of the plurality of actual communication signal channels according to a specific combination of the plurality of combinations when a data symbol of the data pattern generated after the specific combination is descrambled matches a predetermined value.

8. The signal receiving apparatus of claim 1, wherein the signal processing circuit is configured to detect the plurality of test data sequences transmitted by the plurality of actual communication signal channels after a handshake process is performed, or perform a clock data recovery process to rebuild and detect the plurality of test data sequences when the handshake process is not performed.

9. The signal receiving apparatus of claim 1, wherein the link training process comprises a clock signal transmission process for transmitting a clock signal and a test data signal transmission process for transmitting the plurality of test data sequences;

the signal processing circuit is configured to selectively detect the signal amount during the clock signal transmission process or detect the signal amount during the test data signal transmission process, and configured to detect the plurality of test data sequences in the test data signal transmission process.

10. The signal receiving apparatus of claim 1, wherein the signal receiving interface is a DisplayPort (DP) interface version 1.4, a DisplayPort interface version 2.1 or a Universal Serial Bus Type-C (USB Type-C) interface.

11. A signal receiving method having a channel identifying mechanism used in a signal receiving apparatus, comprising:

electrically coupling a signal receiving interface to a signal transmission line such that a plurality of signal channels comprised by the signal receiving interface perform signal receiving, each of the plurality of signal channels comprising a pair of differential signal lines;

in a link training process, detecting a signal amount of each of the plurality of signal channels by a signal processing circuit, to determine the plurality of signal channels having the signal amount matching a first predetermined criteria to be a plurality of actual communication signal channels;

in the link training process, detecting a plurality of test data sequences transmitted by the plurality of actual communication signal channels by the signal processing circuit to identify a polarity order of the different signal lines of each of the plurality of actual communication signal channels and a channel number order of the plurality of actual communication signal channels according to a data pattern of each of the plurality of test data sequences; and after the link training process is finished, performing actual data receiving from the signal transmission line through the plurality of actual communication signal channels according to the polarity order and the channel number order by the signal processing circuit.

12. The signal receiving method of claim 11, further comprising:

determining whether an instantaneous value or an average value of the signal amount is larger than a predetermined signal amount threshold value by the signal processing circuit, so as to determine that the signal amount matches the first predetermined criteria when the instantaneous value or the average value is larger than the predetermined signal amount threshold value.

13. The signal receiving method of claim 11, further comprising:

determining a number of times that a variation amount of the signal amount is larger than a predetermined variation amount threshold value by the signal processing circuit, so as to determine that the signal amount matches the first predetermined criteria when the number of times is larger than a threshold value of the number of times.

14. The signal receiving method of claim 11, further comprising:

comparing the data pattern with an expected data pattern or comparing a certain data content of the data pattern with an expected data content by the signal processing circuit to identify the polarity order;

determining that the polarity order is a forward order when the data pattern matches the expected data pattern or when the certain data content matches the expected data content by the signal processing circuit;

determining that the polarity order is a reverse order when the data pattern does not match the expected data pattern or when the certain data content does not match the expected data content by the signal processing circuit;

receiving data from the pair of differential signal lines of each of the plurality of actual communication signal channels by the signal processing circuit when the polarity order is the forward order; and reversing and receiving the data from the pair of differential signal lines of each of the plurality of actual communication signal channels by the signal processing circuit when the polarity order is the reverse order.

15. The signal receiving method of claim 14, wherein the certain data content is a physical layer (PHY) synchronization (sync) symbol or main stream attribute data, the signal receiving method further comprising:

determining the polarity order to be the forward order when the physical layer synchronization symbol matches a forward content or when the main stream attribute data corresponding to the data pattern of a plurality of different frames is the same and a data size matches a second predetermined criteria.

16. The signal receiving method of claim 11, further comprising:

determining that the data pattern of each of the plurality of test data sequences is the same and a transmission timing between two of the plurality of test data sequences are different from each other and distanced from each other with a fixed interval by the signal processing circuit, so as to determine the channel number order of the plurality of actual communication signal channels according to an order of the transmission timing.

17. The signal receiving method of claim 11, further comprising:

descrambling a plurality of combinations of the plurality of test data sequences according to a plurality of channel predetermined initial values corresponding to the channel number order by the signal processing circuit, so as to determine the channel number order of the plurality of actual communication signal channels according to a specific combination of the plurality of combinations when a data symbol of the data pattern generated after the specific combination is descrambled matches a predetermined value.

18. The signal receiving method of claim 11, further comprising:

detecting the plurality of test data sequences transmitted by the plurality of actual communication signal channels after a handshake process is performed, or performing a clock data recovery process to rebuild and detect the plurality of test data sequences when the handshake process is not performed by the signal processing circuit.

19. The signal receiving method of claim 11, wherein the link training process comprises a clock signal transmission process for transmitting a clock signal and a test data signal transmission process for transmitting the plurality of test data sequences, the signal receiving method further comprising:

selectively detecting the signal amount during the clock signal transmission process or detecting the signal amount during the test data signal transmission process, and detecting the plurality of test data sequences in the test data signal transmission process by the signal processing circuit.

20. The signal receiving method of claim 11, wherein the signal receiving interface is a DisplayPort interface version 1.4, a DisplayPort interface version 2.1 or a Universal Serial Bus Type-C interface.

* * * * *